United States Patent
Lin et al.

(10) Patent No.: US 9,377,994 B2
(45) Date of Patent: Jun. 28, 2016

(54) GATE DRIVER CIRCUIT

(71) Applicant: AU Optronics Corporation, Hsin-Chu (TW)

(72) Inventors: Wei-Li Lin, Hsin-Chu (TW); Che-Wei Tung, Hsin-Chu (TW); Chia-Heng Chen, Hsin-Chu (TW); Shu-Fang Hou, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 302 days.

(21) Appl. No.: 14/225,962

(22) Filed: Mar. 26, 2014

(65) Prior Publication Data

US 2014/0372494 A1    Dec. 18, 2014

(30) Foreign Application Priority Data

Jun. 14, 2013   (TW) .............................. 102121152 A (51) Int. Cl.
  *G11C 19/28*  (2006.01)
  *G06F 5/08*  (2006.01)

(52) U.S. Cl.
  CPC ........................................ *G06F 5/08* (2013.01)

(58) Field of Classification Search
  None
  See application file for complete search history.

(56) References Cited

U.S. PATENT DOCUMENTS

| 2012/0075275 | A1  | 3/2012 | Chen et al. |
| 2012/0153996 | A1* | 6/2012 | Su ................. G09G 3/3659 327/109 |
| 2014/0160000 | A1* | 6/2014 | Ma ................. G09G 3/3677 377/64 |
| 2015/0255172 | A1* | 9/2015 | Kuo ............... G11C 19/287 327/109 |

FOREIGN PATENT DOCUMENTS

| CN | 103151076 A | 6/2013 |
| TW | 201040931   | 11/2010 |
| TW | I360094     | 3/2012 |

* cited by examiner

*Primary Examiner* — Long Nguyen
(74) *Attorney, Agent, or Firm* — WPAT, PC; Justin King (57) ABSTRACT

A gate driver circuit includes several shift register stages. One of shifter register stages includes a pull-up unit, a pull-up control unit, and an output unit. The pull-up unit is configured for generating a driving signal according to a first clock signal and an operating signal. The pull-up control unit is configured for generating a next-stage operating signal to a next-stage shift register stage according to the first clock signal, the operating signal and the driving signal. The output unit is configured for receiving the driving signal and generating a first gate driving signal and a second gate driving signal according to a first controlling signal and a second controlling signal, respectively.

15 Claims, 5 Drawing Sheets

GATE DRIVER CIRCUIT

RELATED APPLICATIONS

This application claims priority to Taiwan Application Serial Number 102121152 filed Jun. 14, 2013, which is herein incorporated by reference.

BACKGROUND

1. Field of Disclosure

The present disclosure relates to a display panel. More particularly, the present disclosure relates to a gate driver circuit adapted for a liquid crystal display panel.

2. Description of Related Art

In recent years, various LCD (liquid crystal display) monitors have been popular. In order to reduce the cost, the gate driver circuit configured for generating the driving signals is manufactured on the glass substrate array (i.e., Gate Driver on Array, GOA). There has been a problem that the viewing angle of the LCD monitor is too narrow, i.e., a problem that a side perspective of the frame is partially white (color washout). The conventional method is that each pixel of the display panel of the LCD monitor is divided into a first pixel electrode and a second pixel electrode. Moreover, by controlling various switches to be turned on according to a charging signal and a charge-sharing signal, the voltage of the first pixel electrode is different from the voltage of the second pixel electrode. Accordingly, the luminance of the first pixel electrode is different from the luminance of the second pixel electrode, and the problem of partially white side perspective is improved.

The conventional shift register stage adapted for the charge-sharing pixels includes two shift registers for outputting two driving signals with various time sequences to the corresponding gate lines. Since a gate driver circuit must include two shift registers for controlling a single pixel stage, not only the complicacy of the layout process but also the layout area is increased. As a result, the cost of manufacturing the LCD devices is increased.

SUMMARY

In order to solve the above problems, one aspect of the present disclosure is to provide a gate driver circuit. Through the design of the shift register stages of the gate driver circuit, each of shift register stages can output two gate driving signals with various time sequences to the corresponding pixels.

One aspect of the present disclosure is to provide a gate driver circuit. The gate driver circuit includes several serial-coupled shift register stages. An n-th shift register stage of the shift register stages includes a pull-up unit, a pull-up control unit, and an output unit. The pull-up unit is configured for receiving a first clock signal and an n-th operating signal. When the n-th operating signal is at high logic level, the pull-up unit generates an n-th driving signal according to the first clock signal and pulls up the n-th operating signal. The pull-up control unit is configured for receiving the first clock signal, the n-th operating signal, and the n-th driving signal. When the n-th operating signal is at high logic level, the pull-up control unit outputs the n-th driving signal to an (n+1)-th shift register stage according to the first clock signal. The output unit is configured for receiving the n-th driving signal. Moreover, the output unit is configured for generating a first gate driving signal according to a first controlling signal and generating a second gate driving signal according to a second controlling signal, in which the first controlling signal and the second controlling signal are non-overlapped.

According to one embodiment of the present disclosure, when a duty cycle of the first clock signal is 1/m, the first controlling signal is an (n−m)-th operating signal of an (n−m)-th shift register stage, and the second controlling signal is an (n+m)-th operating signal of an (n+m)-th shift register stage, in which m is an integer larger than three.

According to one embodiment of the present disclosure, the output unit includes a first transistor and a second transistor. The first transistor has a gate end configured for receiving the first controlling signal, a first end configured for receiving the n-th driving signal, and a second end configured for outputting the first gate driving signal. The second transistor has a gate end configured for receiving the second controlling signal, a first end configured for receiving the n-th driving signal, and a second end configured for outputting the second gate driving signal. When the first transistor is turned on by the first controlling signal, the first transistor generates the first gate driving signal according to the n-th driving signal. When the second transistor is turned on by the second controlling signal, the second transistor generates the second gate driving signal according to the n-th driving signal In summary, through the aforementioned embodiments, each of the shift register stages of the gate driver circuit can output two gate driving signals with various time sequences to the corresponding pixels. Moreover, the complicacy of the layout design of the gate driver circuit is simplified thereby.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

Figure 1:
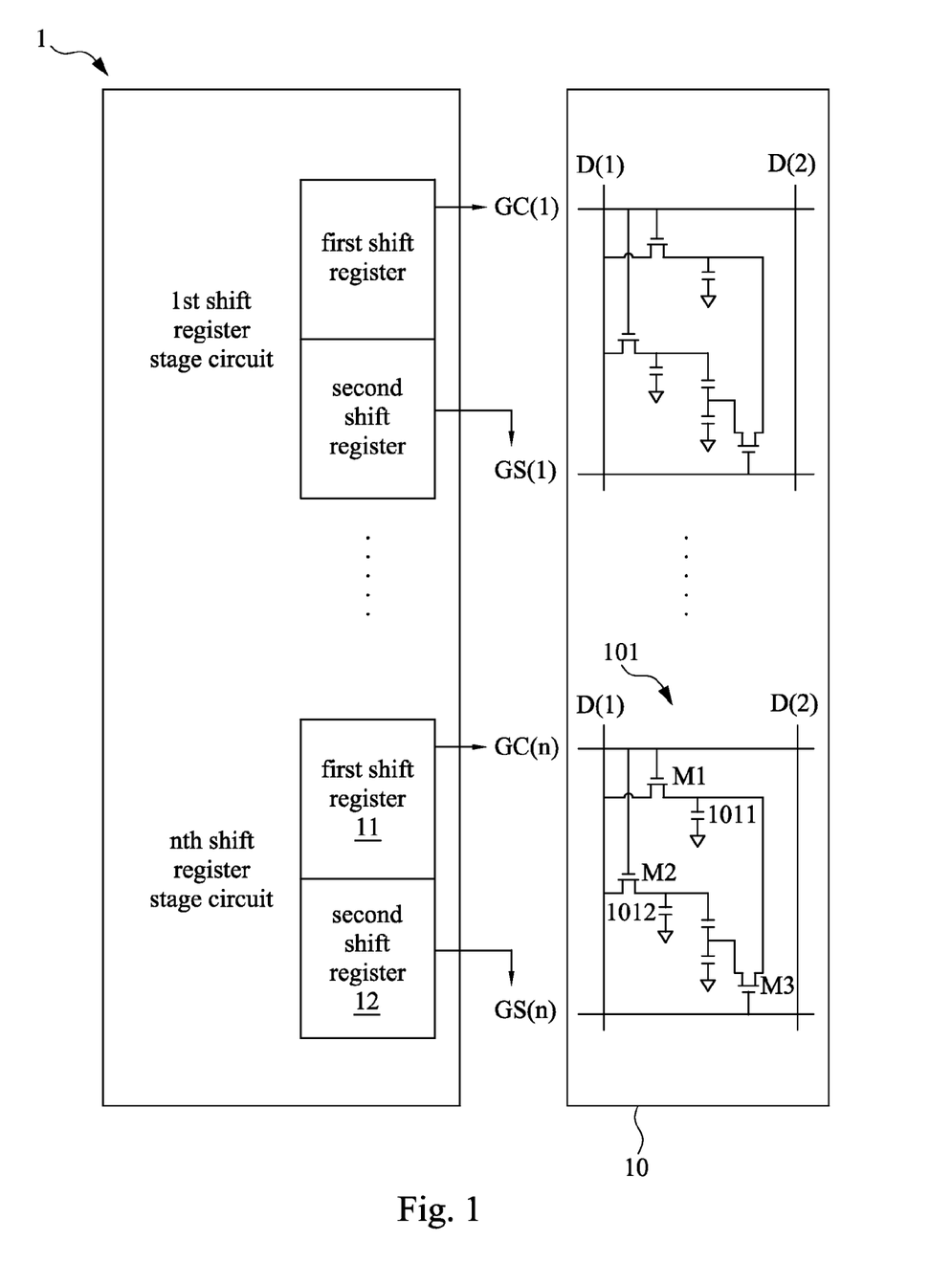
FIG. 1 is a schematic diagram illustrating a gate driver circuit adapted for the charge-sharing pixels according to one embodiment of the present disclosure.

Referring to FIG. 1, FIG. 1 is a schematic diagram illustrating a gate driver circuit adapted for the charge-sharing pixels according to one embodiment of the present disclosure. As shown in FIG. 1, the gate driver circuit 1 includes several shift register stages, in which an n-th shift register stage of the shift register stages includes a first shift register 11 and a second shift register 12. The n-th shift register stage is corresponding to a pixel 101 of a pixel array 10. The pixel 101 includes three switches M1, M2, and M3. The switch M1 is configured for controlling a pixel voltage of a first pixel electrode 1011. The switch M2 is configured for controlling a pixel voltage of a second pixel electrode 1012. The switch M3 is configured for adjusting pixel voltages of the first pixel electrode 1011 and the second pixel electrode 1012. First, the first shift register 11 outputs a charging signal GC(n) for turning on the switch M1 and the switch M2 such that the first pixel electrode 1011 and the second pixel electrode 1012 are charged to pixel voltages, respectively. Then, the second shift register 12 outputs a charge-sharing signal GS(n) for turning on the switch M3 such that the first pixel electrode 1011 is coupled to the second pixel electrode 1012. Accordingly, the pixel voltage of the first pixel electrode 1011 and the pixel voltage of the second pixel electrode 1012 are adjusted such that the luminance of the first pixel electrode 1011 is different from the luminance of the second pixel electrode 1012. In the aforementioned process, the charging signal GC(n) and the charge-sharing signal GS(n) have various time sequences in order to prevent the pixel from being charged and shared at the same time, i.e., prevent the efficiency of charge-sharing from being reduced. Therefore, each of shift register stages includes two shift registers configured for generating the driving signals with various time sequences.

Figure 2:
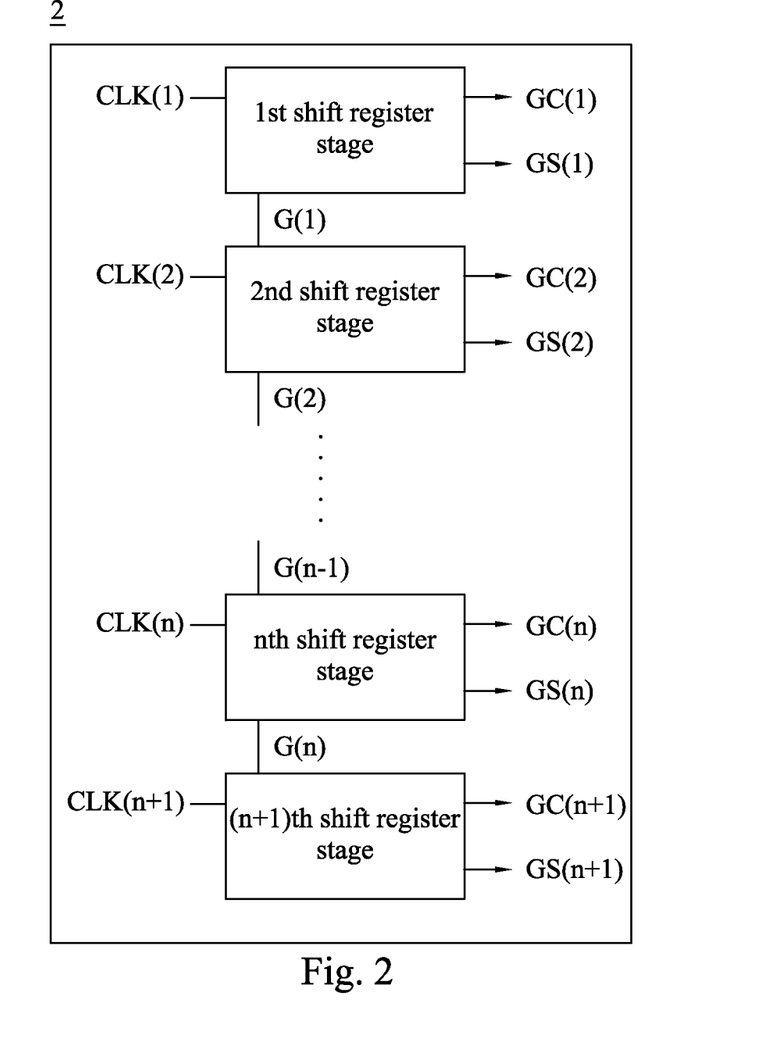
FIG. 2 is a block diagram illustrating a gate driver circuit according to one embodiment of the present disclosure.

Referring to FIG. 2, FIG. 2 is a block diagram illustrating a gate driver circuit according to one embodiment of the present disclosure. As shown in FIG. 2, the gate driver circuit 2 includes several shift register stages corresponding to each pixel of the pixel array (not shown in the figure), respectively. An n-th shift register stage of the shift register stages receives an (n−1)-th driving signal G(n−1) outputted from the previous shift register stage and configures the (n−1)-th driving signal G(n−1) as an n-th operating signal Q(n) of the n-th shift register stage. Moreover, the n-th shift register stage outputs a first gate driving signal GC(n) according to an n-th clock signal CLK(n), the n-th operating signal Q(n), and a first controlling signal C1, and outputs a second gate driving signal GS(n) according to the n-th clock signal CLK(n), the n-th operating signal Q(n), and a second controlling signal C2. The first gate driving signal GC(n) and the second gate driving signal GS(n) are outputted to corresponding n-th pixels. The first gate driving signal GC(n) and the second gate driving signal GS(n) are configured for charging and sharing the charges of the corresponding n-th pixels, respectively. Furthermore, the n-th shift register stage generates an n-th driving signal G(n) to the next shift register stage according to the n-th clock signal CLK(n).

Figure 3:
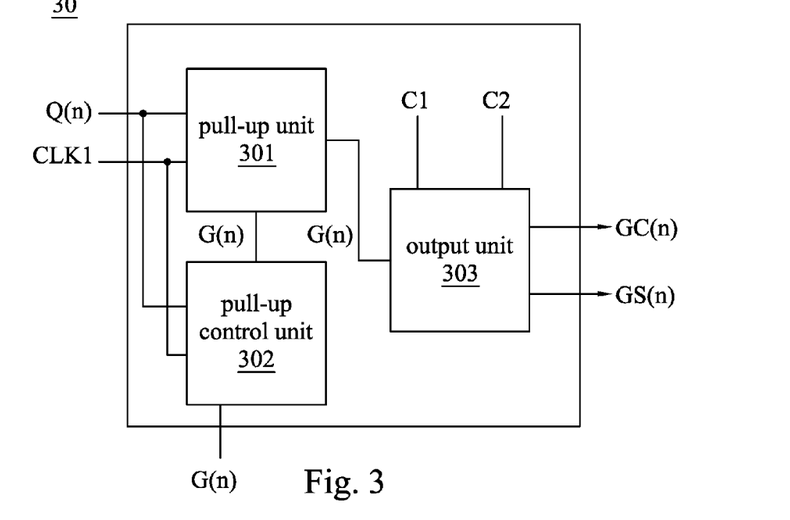
FIG. 3 is a block diagram illustrating a shift register according to one embodiment of the present disclosure.

Referring to FIG. 3, FIG. 3 is a block diagram illustrating a shift register according to one embodiment of the present disclosure. The shift register 30 in FIG. 3 can be the n-th shift register stage of the gate driver circuit 2 in FIG. 2. As shown in FIG. 3, the shift register 30 includes a pull-up unit 301, a pull-up control unit 302, and an output unit 303. The pull-up unit 301 receives an (n−1)-th driving signal G(n−1) outputted from a previous shift register stage (not shown in the figure) as an n-th operating signal Q(n) and receives a first clock signal CLK1. When the n-th operating signal Q(n) is at high logic level, the pull-up unit 301 generates an n-th driving signal G(n) to the pull-up control unit 302 and the output unit 303 according to the first clock signal CLK1. The pull-up control unit 302 receives the n-th operating signal Q(n), the first clock signal CLK1, and the n-th driving signal G(n). When the n-th operating signal Q(n) is at high logic level, the pull-up control unit 302 outputs the n-th driving signal G(n) to a next shift register stage (not shown in the figure) as an (n+1)-th operating signal Q(n+1) according to the first clock signal CLK1. The output unit 303 receivers the n-th driving signal G(n), a first controlling signal C1, and a second controlling signal C2. When the first controlling signal C1 is at high logic level, the output unit 303 generates a first gate driving signal GC(n) according to the n-th driving signal G(n). When the second controlling signal C2 is at high logic level, the output unit 303 generates a second gate driving signal GS(n) according to the n-th driving signal G(n).

For the pixels with the same stage, charging time of the pixels can not overlap sharing time of the pixels. Otherwise, the pixel being charged and shared at the same time would result in that the efficiency of charge-sharing is reduced. Accordingly, the first controlling signal C1 and the second controlling signal C2 are designed to be non-overlapped when they are at high logic level. In one embodiment of the present disclosure, if the duty cycle of the first clock signal CLK1 is 1/m, then the first controlling signal C1 is an (n−m)-th operating signal of an (n−m)-th shift register stage and the second controlling signal C2 is an (n+m)-th operating signal of an (n+m)-th shift register stage, in which m is an integer larger than three. For example, the first controlling signal C1 can be an (n−4)-th operating signal Q(n−4) of an (n−4)-th shift register stage, and the second controlling signal C2 can be an (n+4)-th operating signal Q(n+4) of an (n+4)-th shift register stage.

Figure 4:
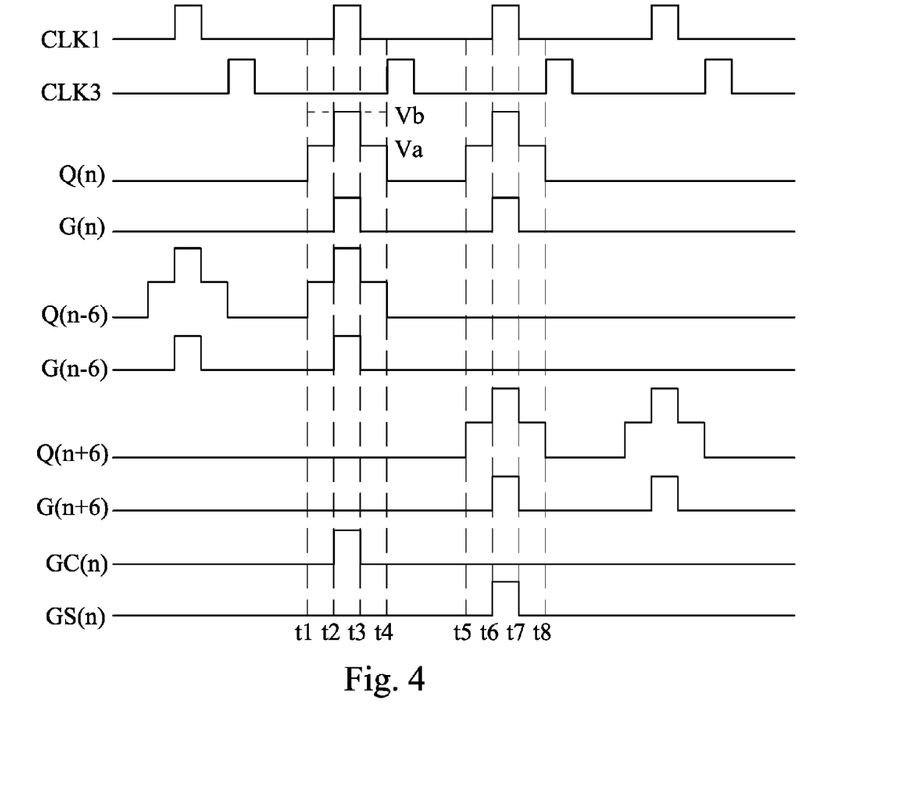
FIG. 4 is a timing diagram illustrating an operation of a shift register according to one embodiment of the present disclosure.

Referring to FIG. 3 and FIG. 4, FIG. 4 is a timing diagram illustrating an operation of a shift register according to one embodiment of the present disclosure. In the present embodiment, the duty cycles of the first clock signal CLK1 and a third clock signal CLK3 are 1/6; i.e., the first controlling signal C1 can be an (n−6)-th operating signal Q(n−6) of an (n−6)-th shift register stage and the second controlling signal C2 can be an (n+6)-th operating signal Q(n+6) of an (n+6)-th shift register stage, but it is not limited thereto. As shown in FIG. 4, at time t2, the pull-up unit 301 generates the n-th driving signal G(n) according to the first clock signal CLK1 when the n-th operating signal Q(n) is at high logic level. Moreover, the n-th driving signal G(n) and the first controlling signal C1 (the (n−6)-th operating signal Q(n−6)) are at high logic level, too. As a result, the output unit 303 generates the first gate driving signal GC(n) according to the n-th driving signal. Since the second controlling signal GS(n) (the (n+6)-th operating signal Q(n+6)) is at low logic level at time t2, the output unit 303 may not generate the second gate driving signal GS(n). When the first clock CLK1 is at high logic level next time; i.e., at time t6, the pull-up unit 301 generates the n-th driving signal G(n). Since the first controlling signal C1 is at low logic level while the second controlling signal C2 is at high logic level, the output unit 303 generates the second gate driving signal GS(n) rather that the first gate driving signal GC(n). Accordingly, a single shift register stage can output two gate driving signals to the corresponding pixels by providing the first controlling signal and the second controlling signal which are non-overlapped in the embodiment of the present disclosure.

Figure 5:
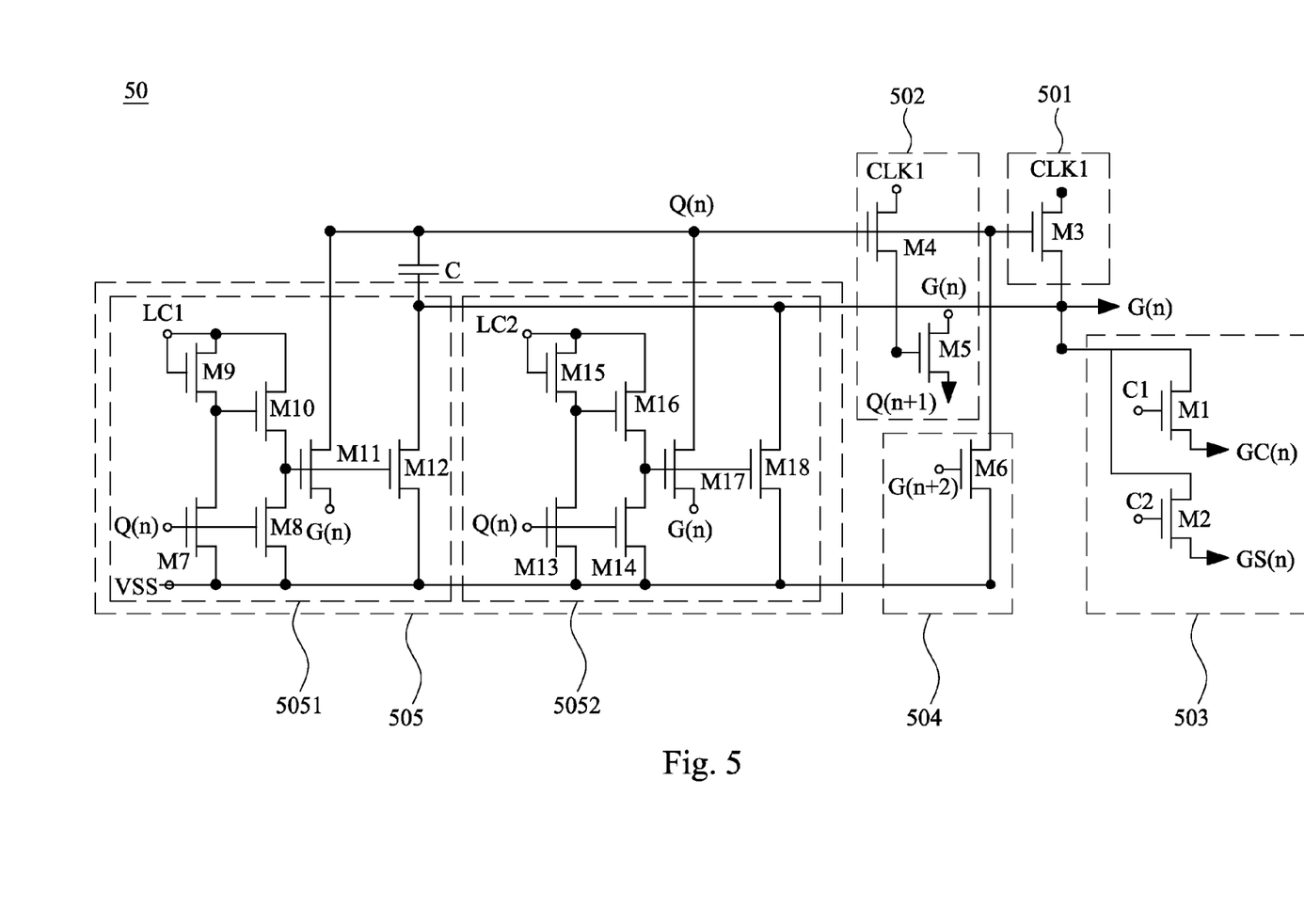
FIG. 5 is a circuit diagram illustrating a shift register according to one embodiment of the present disclosure.

Referring to FIG. 5, FIG. 5 is a circuit diagram illustrating a shift register according to one embodiment of the present disclosure. The shift register 50 in FIG. 5 can be the n-th shift register stage of the gate driver circuit 2 in FIG. 2. As shown in FIG. 5, the shift register 50 includes a pull-up unit 501, a pull-up control unit 502, an output unit 503, a pull-down unit 504, and an auxiliary pull-down unit 505. The pull-down unit 504 is electrically coupled to a voltage source Vss. The pull-down unit 504 is configured for pulling down the n-th operating signal Q(n) to a voltage of the voltage source Vss. The auxiliary unit 505 is also electrically coupled to the voltage Vss. The auxiliary unit 505 is configured for maintaining the n-th operating signal Q(n) and the n-th driving signal G(n) to the voltage of the voltage source Vss, in which the voltage of the voltage source Vss is at low voltage level.

The output unit 503 includes a first transistor M1 and a second transistor M2. A gate end of the first transistor M1 is configured for receiving the first controlling signal C1. A drain end of the first transistor M1 is configured for receiving the n-th driving signal G(n). A source end of the first transistor M1 is configured for outputting the first gate driving signal GC(n). A gate end of the second transistor M2 is configured for receiving the second controlling signal C2. A drain end of the second transistor M2 is configured for receiving the n-th driving signal G(n). A source end of the second transistor M2 is configured for outputting the second gate driving signal GS(n). When the first controlling signal C1 is at high logic level, the first transistor M1 is turned on such that the source end of the first transistor M1 generates the first gate driving signal GC(n) according to the n-th driving signal G(n) received from the drain end of the first transistor M1. Similarly, when the second controlling signal C2 is at high logic level, the second transistor M2 is turned on such that the source end of the second transistor M2 generates the second gate driving signal GS(n) according to the n-th driving signal G(n) received from the drain end of the second transistor M2.

The pull-up unit 501 includes a third transistor M3. A gate end of the third transistor M3 is configured for receiving an (n−1)-th driving signal G(n−1) from the previous shift register stage (not shown in the figure) as the n-th operating signal. A drain end of the third transistor M3 is configured for receiving the first clock signal CLK1. A source end of third transistor M3 is electrically coupled to the drain end of the first transistor M1 and the drain end of the second transistor M2. A source end of third transistor M3 is configured for outputting the n-th driving signal G(n) to the first transistor M1 and the second transistor M2. When the n-th operating signal Q(n) is at high logic level, the third transistor M3 is turned on such that the source end of the third transistor M3 generates the n-th driving signal G(n) according to the first clock signal CLK1 received from the drain end of the third transistor M3.

The pull-up control unit 502 includes a fourth transistor M4 and a fifth transistor M5. A gate end of the fourth transistor M4 is configured for receiving the n-th operating signal Q(n). A drain end of the fourth transistor M4 is configured for receiving the first clock signal CLK1. A gate end of the fifth transistor M5 is electrically coupled to a source end of the fourth transistor M4. A drain end of the fifth transistor M5 is configured for receiving the n-th driving signal G(n). A source end of the fifth transistor M5 is configured for outputting the n-th driving signal G(n) to the next shift register stage (not shown in the figure) as an (n+1)-th operating signal. When the n-th operating signal Q(n) is at high logic level, the fourth transistor M4 is turned on. At this moment, when the first clock signal CLK1 is also at high logic level, the fifth transistor M5 is turned on such that the source end of the fifth transistor M5 outputs the n-th driving signal G(n) received from the drain end of the fifth transistor M5 to a next-stage shift register stage (not shown in the figure).

The pull-down unit 504 includes a sixth transistor M6. A gate end of the sixth transistor M6 is configured for receiving an (n+2)-th driving signal G(n+2). A drain end of the sixth transistor M6 is configured for receiving the n-th operating signal Q(n). A source end of the sixth transistor M6 is electrically coupled to the voltage source Vss. When the (n+2)-th driving signal G(n+2) is at high logic level, the sixth transistor M6 is turned on such that the n-th operating signal Q(n) is pulled down to the voltage of the voltage source Vss.

The auxiliary pull-down unit 505 is configured for maintaining the n-th operating signal Q (n) and the n-th driving signal to the voltage of the voltage source Vss. As shown in FIG. 5, the auxiliary pull-down unit 505 includes a first input unit 5051 and a second input unit 5052, in which the first input unit 5051 and the second input unit 5052 have the same architecture. The first input unit 5051 includes transistors M7, M8, M9, M10, M11, and M12. The second input unit 5052 includes transistors M13, M14, M15, M16, M17, and M18. The first input unit 5051 and the second input unit 5052 are configured for receiving a first low frequency signal LC1 and a second low frequency signal LC2, respectively. The first low frequency signal LC1 and the second low frequency signal LC2 are complementary. In other words, when the first low frequency signal LC1 is at high logic level while the second low frequency signal LC2 is at low logic level, and the first low frequency signal LC1 is at low logic level while the second low frequency signal LC2 is at high logic level. Whereby the n-th operating signal Q(n) and the n-th driving signal G(n) are maintained to the voltage of the voltage source Vss.

For the first input unit 5051, gate ends of the transistors M7 and M8 are configured for receiving the n-th operating signal Q(n). Drains of the transistors M9 and M10 are configured for receiving the first low frequency signal LC1. When the n-th operating signal Q(n) is at low logic level, the transistors M7 and M8 are turned off. At this moment, when the first low frequency signal LC1 is at high logic level, the transistors M9 and M10 are tuned on such that the transistors M11 and M12 are turned on. As a result, the n-th operating signal Q(n) and the n-th driving signal G(n) are maintained to the voltage of the voltage source Vss. Moreover, for the second input unit 5052, the operation of the second input unit 5052 is similar to the first input unit 5051 except that drain ends of the transistors M15 and M16 are configured for receiving the second low frequency signal. Accordingly, when the n-th operating signal Q(n) is at low logic level, the n-th operating signal Q(n) and the driving signal G(n) can be maintained to the voltage of the voltage source Vss by the auxiliary unit 505 receiving the first low frequency signal LC1 and the second low frequency signal LC2 in which the first low frequency signal LC1 and the second low frequency signal LC2 are complementary.

When the n-th operating signal Q(n) is at high logic level, the transistors M7, M8, M13, and M14 are turned on such that the transistors M11, M12, M17, and M18 are turned off. As a result, the pull-up unit 501 and the pull-up control unit 502 are enabled until the (n+2)-th driving signal received from the pull-down unit 504 is at high logic level. Then, the n-th operating signal Q(n) is pulled down to the voltage of the voltage source Vss.

Referring to FIG. 4 and FIG. 5, at time t1, a pull-up unit of the previous shift register stage (not shown in the figure) outputs a (n−1)-th driving signal G(n−1) as the n-th operating signal Q(n) of the n-th shift register stage. The third transistor M3 and the fourth transistor M4 are turned on. However, since the first clock signal CLK1 is at low logic level, the transistor M3 does not generate the n-th driving signal G(n) and the n-th operating signal Q(n) is maintained to a voltage Va. At time t2, the first clock signal CLK1 is at high logic level such that the third transistor M3 generates the n-th driving signal G(n) according to the first clock signal CLK1. Moreover, the n-th operating signal Q(n) is pulled up to a voltage level Vb according to the capacitive coupling effect of the parasitic capacitance of the third transistor M3 (not shown in the figure). Furthermore, at time t2, since the first controlling signal C1 (the (n−6)-th operating signal Q(n−6)) is also at high logic level, the first transistor M1 is turned on by the first controlling signal C1 and generates the first gate driving signal GC(n) according to the n-th driving signal G(n). At the same time, since the second controlling signal C2 (the (n+6)-th operating signal Q(n+6)) is not risen, the second transistor M2 is turned off such that the second transistor M2 does not output the second gate driving signal GS(n).

At time t3, the first clock signal CLK1 is pulled down to low logic level such that the n-th driving signal G(n) is pulled down to low logic level, too. As a result, the n-th operating signal Q(n) is pulled down to the voltage Va. At time t4, since the third clock signal CLK3 is at high logic level, the (n+2)-th driving signal G(n+2) (not shown in the figure) generated from an (n+2)-th shift register stage (not shown in the figure) is at high logic level, too. As a result, the sixth transistor M6 of the pull-down unit 504 is turned on such that the n-th operating signal Q(n) is pulled down to the voltage of the voltage source Vss. Moreover, the n-th operating signal Q(n) and the n-th driving signal G(n) are maintained to the voltage of the voltage source Vss by the auxiliary pull-down unit 505.

In time t5 to time t8, the n-th operating signal Q(n) is at high logic level again, the operation herein is similar to the operation in time t1 to time t4. The difference is that the first controlling signal C1 is maintained to the voltage of the voltage source Vss and the second controlling signal C2 is at high logic level at time t6. As a result, the first transistor M1 is still turned off, and the second transistor M2 is turned on such that the output unit 503 only outputs the second gate driving signal GS(n). In such a condition, a single shift register can be configured for outputting two driving signals with various time sequences to the pixels. The present embodiment can be adapted for the display device with charge-sharing pixels, but it is not limited thereto. In other words, the present embodiment can be adapted for the touch sense display devices, too. For example, the first gate driving signal GC(n) can be provided to the scan lines of the pixel array and the second gate driving signal GS(n) can be provided to the sense lines of the touch driver, but it is not limited thereto.

Moreover, at time t2, when the first clock signal CLK1 is at high logic level, the first clock signal CLK1 would further turn on the fifth transistor M5 of the pull-up control unit 502. As a result, the fifth transistor M5 can output the n-th driving signal G(n) to the next-stage shift register stage (not shown in the figure) as the (n+1)-th operating signal. Accordingly, the first gate driving signal and the second gate driving signal can be outputted accurately by the control of the driving signals outputted from the previous shift register stages and the control of the clock signals.

The shift register 50 can further include a capacitor C coupled between the gate end and the source end of the third transistor M3. Whereby the pull-up unit 501 can pull up the n-th operating signal Q(n) to higher voltage by the capacitive coupling effect such that the driving ability of the n-th operating signal Q(n) is increased when the first clock signal CLK1 is at high logic level. At the same time, the driving ability of the first controlling signal C1 and the second controlling signal C2 are increased, too.

Figure 6:
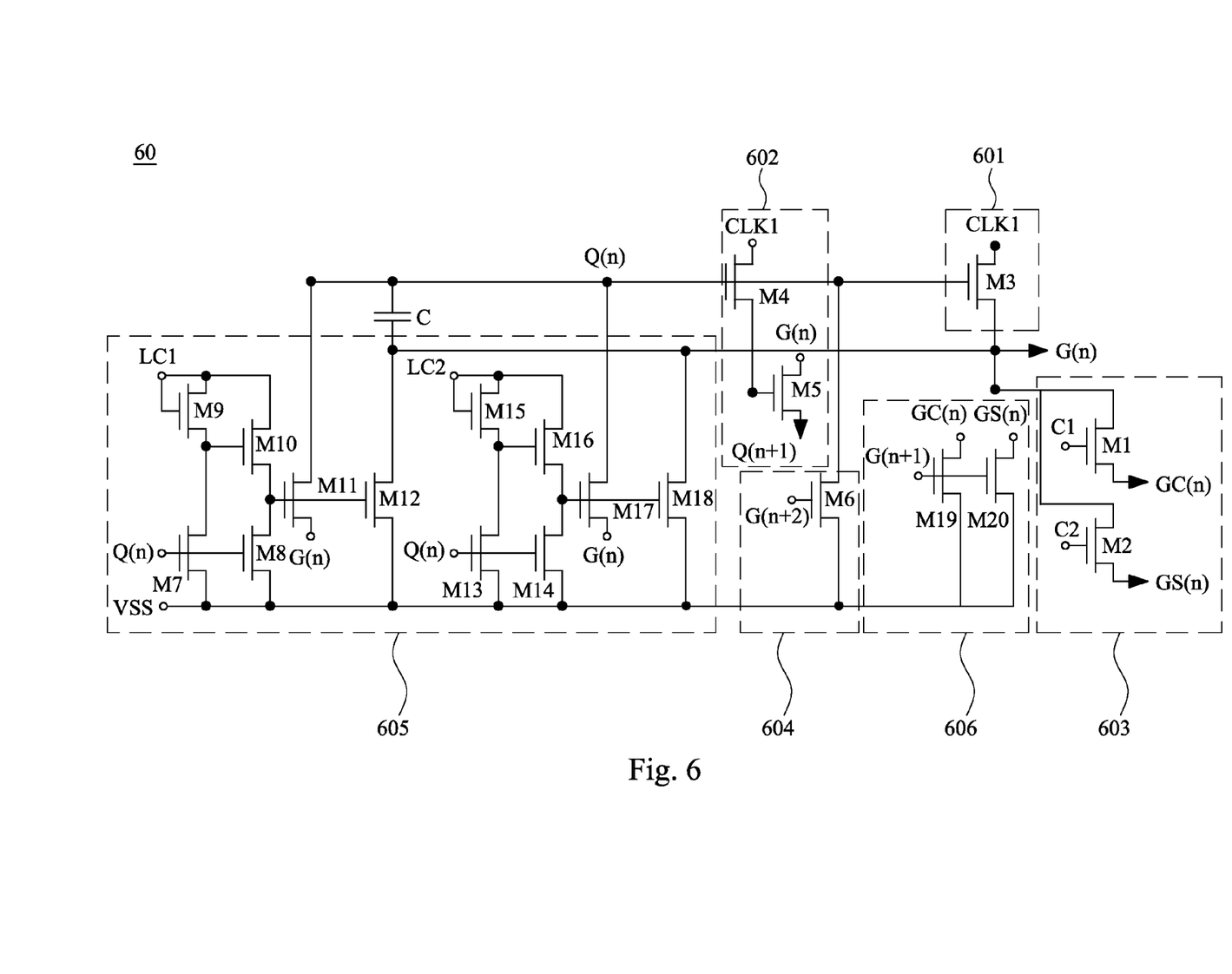
FIG. 6 is a circuit diagram illustrating a shift register according to another embodiment of the present disclosure.

Furthermore, the source of the first controlling signal and the second controlling signal can come from other signals. Referring to FIG. 6, FIG. 6 is a circuit diagram illustrating a shift register according to another embodiment of the present disclosure. Comparing to FIG. 5, the shift register 60 further includes a second pull-down unit 606 electrically coupled to the voltage source Vss. Moreover, the first controlling signal C1 and the second controlling signal C2 of the shift register 60 are various driving signals stage, in which the first controlling signal C1 and the second controlling signal C2 are configured for controlling the outputs of the first gate driving signal GC(n) and the second gate driving signal GS(n). Similarly, the first controlling signal C1 can be an (n−k)-th driving signal G(n−k) of an (n−k)-th shift register stage, and the second controlling signal C2 can be an (n+k)-th driving signal G(n+k) of an (n+k)-th shift register stage, in which k is an integer larger than three.

Referring to FIG. 4 and FIG. 6, at time t2, when the first clock signal CLK1 is at high logic level, the pull-up unit 601 generates the n-th driving signal G(n). At the same time, the (n−6)-th operating signal Q(n−6) and the first clock signal CLK1 are at high logic level such that the (n−6)-th shift register stage (not shown in the figure) generates the (n−6)-th driving signal G(n−6). Since the first controlling signal C1 is the (n−6)-th driving signal G(n−6), the output unit 603 outputs the first gate driving signal GC(n). Additionally, since the (n+6)-th driving signal G(n+6) is not generated yet such that the output unit 603 does not output the second gate driving signal GS(n). At time t6, since the (n−6)-th operating signal Q(n−6) is at the voltage of the voltage source Vss such that the (n−6)-th driving signal G(n−6) is at low logic level, too. Additionally, the (n+6)-th driving signal G(n+6) is at high logic level such that the output unit 603 outputs the second gate driving signal GS(n) rather than the first gate driving signal GC(n).

In order to avoid to pull down the first gate driving signal GC(n) and the second gate driving signal GS(n) to low logic level inaccurately, the shift register 60 further includes the second pull-down circuit 606 configured for pulling down the first gate driving signal GC(n) and the second gate driving signal GS(n) to the voltage of the voltage source Vss. The second pull-down unit 606 includes a nineteen-th transistor M19 and a twentieth transistor M20. Gate ends of the nineteen-th transistor M19 and the twentieth transistor M20 are configured for receiving the (n+1)-th driving signal G(n+1).

Drain ends of the nineteen-th transistor M19 and the twentieth transistor M20 are electrically coupled to the voltage source Vss. A source end of the nineteen-th transistor M19 is configured for receiving the first gate driving signal GC(n), and a source of the twentieth transistor M20 is configured for receiving the second gate driving signal GS(n). When the (n+1)-th driving signal is at high logic level, the nineteen-th transistor M19 and the twentieth transistor M20 pull down the first gate driving signal GC(n) and the second gate driving signal GS(n) to the voltage of the voltage source Vss, respectively.

In one embodiment of the present disclosure, since the first controlling signal and the second controlling signal are signals from various shift register stages, a dummy share circuit can be added in front of an 1st shift register stage. The dummy share circuit is configured for providing the first controlling signals of the previous shift register stages. Moreover, the stages of the dummy share circuit is determined by the duty cycle of the clock signal CLK(n); i.e., the aforementioned m or k. For example, in FIG. 4, supposing the first controlling signal C1 is the (n−6)-th operating signal Q(n−6), the stages of the dummy share circuit is six. Accordingly, the dummy circuit can generates the previous 6th operating signal corresponding to the 1st shift register stage as the first controlling signal C1(1) of the 1st shift register stage such that the 1st shift register stage can generate the corresponding first gate driving signal GC(1).

Furthermore, the dummy circuit can be further added in back of a last shift register stage. The dummy circuit is configured for providing the second controlling signals of the next shift register stages. Similarly, the stages of the dummy share circuit is determined by the duty cycle of the clock signal CLK(n); i.e., the aforementioned m or k. For example, in FIG. 4, supposing the second controlling signal C2 is the (n+6)-th operating signal Q(n+6), the stages of the dummy share circuit is six. Accordingly, the dummy circuit can generates the next 6th operating signal corresponding to the last shift register stage as the second controlling signal C2 of the last shift register stage such that the last shift register stage can generate the corresponding second gate driving signal.

As illustrated from the aforementioned embodiments of the present disclosure, a single shift register stage of the gate driver circuit can output two gate driving signals with various time sequences such that it is unnecessary to configure an extra shift register stage. Moreover, since the pull-up unit unit of the shift register in the present disclosure outputs the gate driving signals through two transistors of the output unit rather than outputting the gate driving signals directly, the layout area of the pull-up unit can be reduced. Accordingly, the complicacy of the layout design of the gate driver circuit is simplified and the parasitic capacitance becomes smaller such that the rising time and falling time of the clock signal are reduced and the transmitting speed of the signal is increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A gate driver circuit comprising a plurality of series-coupled shift register stages, an n-th shift register stage of the shift register stages comprising:
    a pull-up unit configured for receiving a clock signal and an n-th operating signal, wherein when the n-th operating signal is at high logic level, the pull-up unit generates an n-th driving signal according to the clock signal;
    a pull-up control unit configured for receiving the clock signal, the n-th operating signal, and the n-th driving signal, wherein when the n-th operating signal is at high logic level, the pull-up control unit outputs the n-th driving signal to an (n+1)-th shift register stage according to the clock signal; and
    an output unit configured for receiving the n-th driving signal, generating a first gate driving signal according to a first controlling signal, and generating a second gate driving signal according to a second controlling signal, wherein the first controlling signal and the second controlling signal are non-overlapped, wherein n is a positive integer.

2. The gate driver circuit as claimed in claim 1, wherein when a duty cycle of the clock signal is 1/m, the first controlling signal is an (n−m)-th operating signal of an (n−m)-th shift register stage, and the second controlling signal is an (n+m)-th operating signal of an (n+m)-th shift register, wherein m is an integer larger than three, and n is larger than m.

3. The gate driver circuit as claimed in claim 1, wherein the output unit comprises:
    a first transistor having a gate end configured for receiving the first controlling signal, a first end configured for receiving the n-th driving signal, and a second end configured for outputting the first gate driving signal; and
    a second transistor having a gate end configured for receiving the second controlling signal, a first end configured for receiving the n-th driving signal, and a second end configured for outputting the second gate driving signal;
    wherein the first gate driving signal is output according to the n-th driving signal and the first controlling signal, and the second gate driving signal is output according to the n-th driving signal and the second controlling signal.

4. The gate driver circuit as claimed in claim 3, wherein the pull-up unit comprises a third transistor having a gate end configured for receiving the n-th operating signal, a first end configured for receiving the clock signal, and a second end configured for outputting the n-th driving signal.

5. The gate driver circuit as claimed in claim 4, further comprising a capacitor electrically coupled between the gate end of the third transistor and the second end of the third transistor.

6. The gate driver circuit as claimed in claim 3, wherein the pull-up control unit comprises:
    a fourth transistor having a gate end configured for receiving the n-th operating signal, a first end configured for receiving the clock signal, and a second end; and
    a fifth transistor having a gate end electrically coupled to the second end of the fourth transistor, a first end configured for receiving the n-th driving signal, and a second end configured for outputting the n-th driving signal.

7. The gate driver circuit as claimed in claim 1, further comprising a first pull-down unit electrically coupled to pull-up unit and a voltage source, wherein the first pull-down unit is configured for pulling down the n-th operating signal to a voltage level of the voltage source.

8. The gate driver circuit as claimed in claim 7, wherein the first pull-down unit comprises a sixth transistor having a gate end configured for receiving an (n+2)-th driving signal, a first end electrically coupled to the pull-up unit, and a second end electrically coupled to the voltage source, wherein when the sixth transistor is turned on by the (n+2)-th driving signal, the first pull-down unit pulls down the n-th operating signal to the voltage of the voltage source.

9. The gate driver circuit as claimed in claim 7, further comprising an auxiliary pull-down unit electrically coupled to the voltage source, wherein the auxiliary pull-down unit is configured for receiving the n-th operating signal and maintaining the n-th operating signal and the n-th driving signal to the voltage of the voltage source according to a first low frequency clock signal and a second low frequency clock signal, wherein the first low frequency clock signal and the second low frequency clock signal are complementary.

10. The gate driver circuit as claimed in claim 9, wherein the auxiliary pull-down unit comprises a first input unit and a second input unit, wherein the first input unit is configured for receiving the first low frequency clock signal, and the second input unit is configured for receiving the second low frequency clock signal.

11. The gate driver circuit as claimed in claim 10, wherein the first input unit comprises:
- a seventh transistor having a gate end configured for receiving the n-th operating signal, a first end, and a second end electrically coupled to the voltage source;
- an eighth transistor having a gate end configured for receiving the n-th operating signal, a first end, and a second end electrically coupled to the voltage source;
- a ninth transistor having a gate end configured for receiving the first low frequency clock signal, a first end electrically coupled the gate end of the ninth transistor, and a second end electrically coupled to the first end of the seventh transistor;
- a tenth transistor having a gate end electrically coupled to the second end of the ninth transistor, a first end electrically coupled to the first end of the ninth transistor, and a second end electrically coupled to the first end of the eighth transistor;
- an eleventh transistor having a gate end electrically coupled to the second end of the tenth transistor, a first end electrically coupled to the pull-up unit; and
- a twelfth transistor having a gate end electrically coupled to the second end of the tenth transistor, a first end electrically coupled to the pull-up unit, and a second end electrically coupled to the voltage source.

12. The gate driver circuit as claimed in claim 10, wherein the second input unit comprises:
- a thirteenth transistor having a gate end configured for receiving the n-th operating signal, a first end, and a second end electrically coupled to the voltage source;
- an fourteenth transistor having a gate end configured for receiving the n-th operating signal, a first end, and a second end electrically coupled to the voltage source;
- a fifteenth transistor having a gate end configured for receiving the second low frequency clock signal, a first end electrically coupled the gate end of the fifteenth transistor, and a second end electrically coupled to the first end of the thirteenth transistor;
- a sixteenth transistor having a gate end electrically coupled to the second end of the fifteenth transistor, a first end electrically coupled to the first end of the fifteenth transistor, and a second end electrically coupled to the first end of the fourteenth transistor;
- a seventeenth transistor having a gate end electrically coupled to the second end of the sixteenth transistor, a first end electrically coupled to the pull-up unit; and
- an eighteenth transistor having a gate end electrically coupled to the second end of the sixteenth transistor, a first end electrically coupled to the pull-up unit, and a second end electrically coupled to the voltage source;
- wherein when the second low frequency clock signal is at high logic level, the second input unit maintains the n-th operating signal and n-th driving signal to the voltage level of the voltage source.

13. The gate driver circuit as claimed in claim 7, wherein when a duty cycle of the clock signal is 1/k, the first controlling signal is an (n−k)-th driving signal of an (n−k)-th shift register stage, and the second controlling signal is an (n+k)-th driving signal of an (n+k)-th shift register stage, wherein k is an integer larger than three, and n is larger than k.

14. The gate driver circuit as claimed in claim 13, further comprising a second pull-down unit electrically coupled to the voltage source, wherein the second pull-down unit is configured for pulling down the first gate driving signal and the second gate driving signal to the voltage level of the voltage source.

15. The gate driver circuit as claimed in claim 14, wherein the second pull-down unit comprises:
- a nineteenth transistor having a gate end configured for receiving an (n+1)-th driving signal, a first end configured for receiving the first gate driving signal, and a second end electrically coupled to the voltage source; and
- a twentieth transistor having a gate end configured for receiving the (n+1)-th driving signal, a first end configured for receiving the second gate driving signal, and a second end electrically coupled to the voltage source;
- wherein when the nineteenth transistor and the twentieth transistor are turned on by the (n+1)-th driving signal, the second pull-down unit pulls down the first gate driving signal and the second gate driving signal to the voltage level of the voltage source.

* * * * *